United States Patent
Chou (10) Patent No.: US 11,988,503 B2
(45) Date of Patent: May 21, 2024

(54) FAILURE DIAGNOSTIC SYSTEM AND FAILURE DIAGNOSTIC METHOD OF MOTOR ENCODER

(71) Applicant: DELTA ELECTRONICS, INC., Taoyuan (TW)

(72) Inventor: Chia-Chih Chou, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 155 days.

(21) Appl. No.: 17/747,921

(22) Filed: May 18, 2022

(65) Prior Publication Data
US 2023/0304794 A1 Sep. 28, 2023

(30) Foreign Application Priority Data
Mar. 22, 2022 (CN) .......................... 202210285655.2

(51) Int. Cl.
*G01B 21/22* (2006.01)
*G05B 23/02* (2006.01)
*G08B 21/18* (2006.01)

(52) U.S. Cl.
CPC .......... *G01B 21/22* (2013.01); *G05B 23/0275* (2013.01); *G08B 21/187* (2013.01)

(58) Field of Classification Search
CPC ... G01B 21/22; G05B 23/0275; G08B 21/187
See application file for complete search history.

(56) References Cited

U.S. PATENT DOCUMENTS

| | | |
|---|---|---|
| 2013/0200836 A1 | 8/2013 | Ishizuka et al. |
| 2015/0130385 A1 | 5/2015 | Ishizuka et al. |
| 2018/0154530 A1* | 6/2018 | Kuno .................. G01L 3/00 |
| 2022/0034969 A1 | 2/2022 | Usagawa et al. |
| 2022/0229437 A1* | 7/2022 | Chen ............. G05D 1/0272 |

FOREIGN PATENT DOCUMENTS

| | | |
|---|---|---|
| CN | 105071711 A | 11/2015 |
| CN | 107614215 A | 1/2018 |
| JP | H11202914 A | 7/1999 |

OTHER PUBLICATIONS

Office Action dated Feb. 21, 2023 of the corresponding Taiwan patent application No. 111110500.
Office Action dated Apr. 25, 2023 of the corresponding Japan patent application No. 2022-084674.

* cited by examiner

*Primary Examiner* — Zoheb S Imtiaz
(74) *Attorney, Agent, or Firm* — Chun-Ming Shih; HDLS IPR SERVICES (57) ABSTRACT

A failure diagnostic system of a motor encoder is disclosed and includes a motor, an encoder, a servo driver, and a safety module. The servo driver controls the motor through a current command. The safety module continuously obtains a feedback position of the motor through the encoder. When the safety module determines based on the feedback position that the current state of the motor is consistent with a pre-determined disturbance condition, the safety module requests the servo driver to output an additional current command to disturb the motor. Next, the safety module determines whether the encoder is failure based on a variation of following feedback position.

14 Claims, 6 Drawing Sheets

FAILURE DIAGNOSTIC SYSTEM AND FAILURE DIAGNOSTIC METHOD OF MOTOR ENCODER

BACKGROUND

Technical Field

The disclosure relates to an encoder of a motor, particularly relates a failure diagnostic system and failure diagnostic method of an encoder.

Description of Related Art

When the motor rotates, the servo driver is configured to read the encoder of the motor to obtain the motor data (for example, rotational angle), thereby obtaining the feedback position of the motor. Further, the servo driver may control the motor's position based on the feedback position.

However, when the feedback position indicates that the motor's position is fixed (that is, the feedback position is not changed), the servo driver is not able to distinguish the reason of the feedback position being non-changed is resulted from the motor's non-rotation or the encoder's failure with motor's rotation. At that condition, the servo driver is not able to correctly control the motor.

As described above, the disclosure provides a failure diagnostic mechanism applicable for the encoder to avoid the system failing to discover the encoder's abnormality and causing the motor to be uncontrollable and dangerous.

In view of this, the inventors have devoted themselves to the aforementioned related art, researched intensively try to solve the aforementioned problems.

SUMMARY OF THE DISCLOSURE

The disclosure provides a failure diagnostic system and a failure diagnostic method of a motor encoder, which may diagnose whether the encoder is malfunction when the motor's position is fixed.

In some embodiments of the disclosure, a failure diagnostic system of a motor encoder is provided. The system includes:
- a motor, including an encoder correspondingly generating a position information according to a rotation of the motor;
- a servo driver, connected with the motor; and
- a safety module, connected with the encoder and the servo driver, and configured to read the position information to obtain a feedback position of the motor and determine whether a state of the motor is consistent with a disturbance condition or an alarming condition according to the feedback position,
  wherein the safety module is configured to request the servo driver to transmit an additional current command to the motor when the state of the motor is determined to be consistent with the disturbance condition, and
  the safety module is configured to request the servo driver to output an abnormal alarming signal when the state of the motor is determined to be consistent with the alarming condition.

In some embodiments of the disclosure, a failure diagnostic method of a motor encoder is provided. The method includes:
a) reading an encoder of a motor to obtain a feedback position of the motor;
b) determining whether a state of the motor is consistent with a disturbance condition or an alarming condition according to the feedback position;
c) when the state of the motor is consistent with the disturbance condition, requesting a servo driver to output an additional current command to the motor; and
d) when the state of the motor is consistent with the alarming condition, requesting the servo driver to output an abnormal alarming signal.

The disclosure is used to disturb the motor when the feedback position provided by the encoder indicates that the motor's position is fixed. Comparing to the related art, the disclosure is used to determine, by the feedback position after being disturbed, whether the motor is indeed non-rotating or the motor is rotating but the encoder is malfunction to provide erroneous feedback position.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
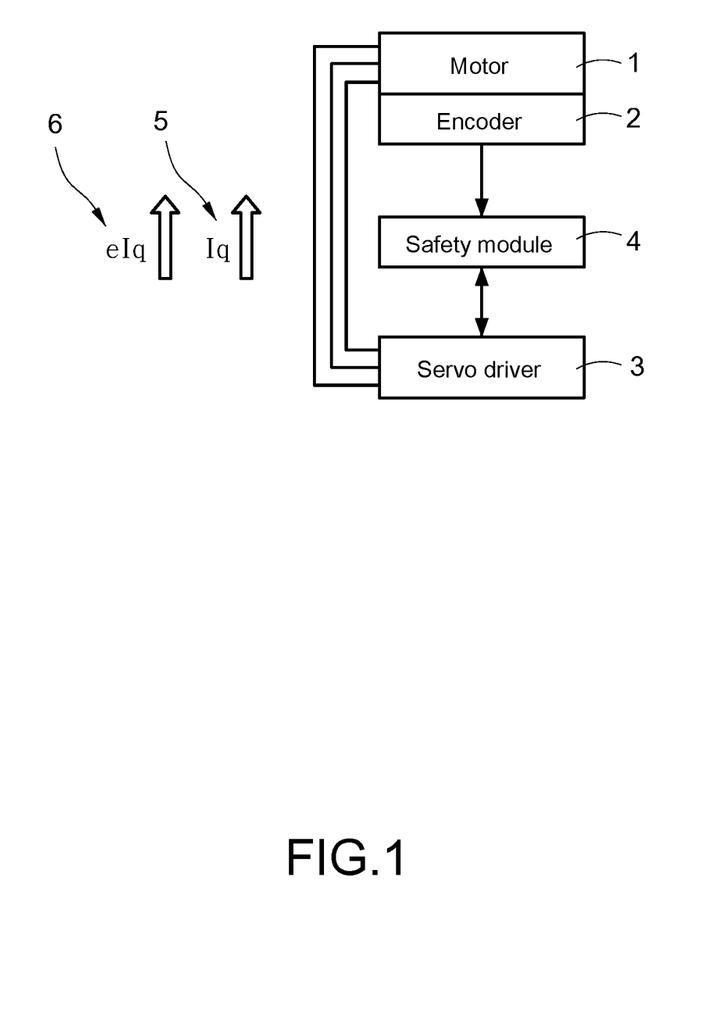
FIG. 1 is a block diagram of the failure diagnostic system of the disclosure in accordance with the first embodiment.

Please refer to FIG. 1, which is a block diagram of the failure diagnostic system of the disclosure in accordance with the first embodiment. The disclosure provides a failure diagnostic system of a motor encoder (abbreviated as the diagnostic system hereafter in the specification). As shown in FIG. 1, the diagnostic system mainly includes a motor 1, an encoder 2 and a servo driver 3.

The encoder 2 may be installed on the axle of the motor 1. When the motor 1 rotates, the encoder 2 is configured to correspondingly generate the motor data according to the rotation of the motor 1. The motor data at least includes the position information of the motor 1. Under the condition of a connecting relation existing between the servo driver 3 and the encoder 2, the servo driver 3 may be configured to read the motor data output by the encoder 2 to further obtain the feedback position of the motor 1. Specifically, the servo driver 3 mainly reads the position information in the motor data to obtain the feedback position of the motor 1. The servo driver 3 may determine the present rotational situation of the motor 1 through the feedback position to further control the position of the motor 1.

In the embodiment of FIG. 1, the servo driver 3 and the motor 1 are directly connected to each other through wire. In some embodiments, the servo driver 3 is configured to correspondingly generate a current command (Iq) 5 according to the feedback position, and transmit the current command 5 to the motor 1 to control the position of the motor 1.

In the disclosure, the diagnostic system further includes a safety module 4. The safety module 4 is connected with the encoder 2 and the servo driver 3. In some embodiments, the safety module 4 may be implemented in a software manner or a firmware manner, and recorded in a hardware unit independent from the servo driver 3. In some other embodiments, the safety module 4 may be implemented in a software manner or a firmware manner, and recorded in the encoder 2, here is not intended to be limiting.

The safety module 4 may be configured to continuously read the position information generated by the encoder 2 to obtain the feedback position of the motor 1. The detail of the feedback position is omitted here for brevity. One feature of the disclosure is that the safety module 4 may monitor and determine the state of the motor 1 according to the feedback position, and determine whether the state of the motor 1 is consistent with the predetermined disturbance condition (described hereafter).

In the disclosure, the state of the motor 1 indicates the halt state of the motor 1. That is, the state which the motor 1 does not rotate.

In the related art, the servo driver 3 mainly obtains the present state (for example, rotating or non-rotating) of the motor 1 by the feedback position. If the feedback position indicates that the position of the motor 1 is not changed, the servo driver 3 is configured to recognize that the position of the motor 1 is fixed. However, in the related art, the servo driver 3 is not able to determine, through the feedback position, that the motor is indeed non-rotating or the erroneous feedback position is resulted from the abnormality of the encoder 2.

The disclosure may solve the aforementioned problems through the arrangement of the safety module 4. Specifically, the safety module 4 is configured to replace the servo driver 3 to obtain the feedback position of the motor 1 from the encoder 2 to determine the state of the motor 1. When the safety module 4 determines that the state of the motor 1 is consistent with the predetermined disturbance condition (for example, the motor 1 does not rotate to a specific time span), the safety module 4 is configured to cooperate with the servo driver 3 to perform confirming action to determine whether the motor 1 is indeed non-rotating or the encoder 2 is in failure condition.

Specifically, when the safety module 4 determines that the state of the motor 1 is consistent with the disturbance condition, the safety module 4 is configured to request the servo driver 3 to transmit the additional current command (eIq) 6 the motor 1. If the encoder 2 is in normal condition, when the motor 1 is shaking because of the influence from the additional current command 6, the motor data generated by the encoder 2 is substantially changed (at least the position information in the motor data is changed), and the feedback position obtained by the safety module 4 may substantially indicate that the position of the motor 1 is changed. Under that condition, the safety module 4 may recognize that the encoder 2 is operating normally.

If the servo driver 3 transmits the additional current command 6 to the motor and the safety module 4 still determines that the position of the motor 1 is fixed based on the following feedback position being obtained, the safety module 4 may recognize that the encoder 2 is in abnormal condition.

The aforementioned description is part of the embodiments of the disclosure, here is not intended to be limiting.

In some embodiments, the safety module 4 is configured to continuously obtain the feedback position of the motor 1, and determine whether the position of the motor 1 is fixed by continuously obtaining the feedback position. If the position of the motor 1 is fixed but the fixed time does not reach the predetermined first time span (for example, 200 ms, 300 ms, etc.), the safety module 4 does not act further and keeps monitoring the state of the motor 1.

If the position of the motor 1 is fixed and the fixed time reaches the first time span, the safety module 4 may recognize that the state of the motor 1 is consistent with the disturbance condition. At the same time, the safety module 4 is configured to request the servo driver 3 to transmit the additional current command 6 to the motor 1 to disturb the motor 1.

The aforementioned description is part of the embodiments of the disclosure, here is not intended to be limiting.

It is worth mentioning that, apart from the aforementioned disturbance condition, the safety module 4 may be configured to determine whether the state of the motor 1 is consistent with the predetermined alarming condition (for example, the motor 1 does not rotate to the time span longer than the required time span of the disturbance condition) according to the feedback position. When the state of the motor 1 is consistent with the alarming condition, the safety module 4 may directly recognize the encoder 2 is in failure condition. At that situation, the safety module 4 may be configured to request the servo driver 3 to output the abnormal alarming signal to notify the user to check and fix the encoder 2.

In some embodiments, the safety module 4 is configured to continuously obtain the feedback position of the motor 1 and continuously determine whether the position of the motor 1 is fixed. If the position of the motor 1 is fixed but the fixed time does not reach the predetermined second time span, the safety module 4 does not act further and keeps monitoring the state of the motor 1. If the position of the motor 1 is fixed and the fixed time reaches the second time span, the safety module 4 may recognize that the state of the motor 1 is consistent with the alarming condition. At the same time, the safety module 4 is configured to request the servo driver 3 to output the abnormal alarming signal.

In some embodiments, the second time span is greater than the first time span. For example, the second time span may be 500 ms, 600 ms, etc., here is not intended to be limiting.

In some embodiments, when the safety module 4 determines that the state of the motor is consistent with the alarming condition, the safety module 4 may be configured to transmit the control command to the servo driver 3. Therefore, the servo driver 3 is configured to display the abnormal alarming signal on the driver panel (not shown in figures) or play the abnormal alarming signal through a buzzer (not shown in figures) based on the control command, here is not intended to be limiting.

Figure 2:
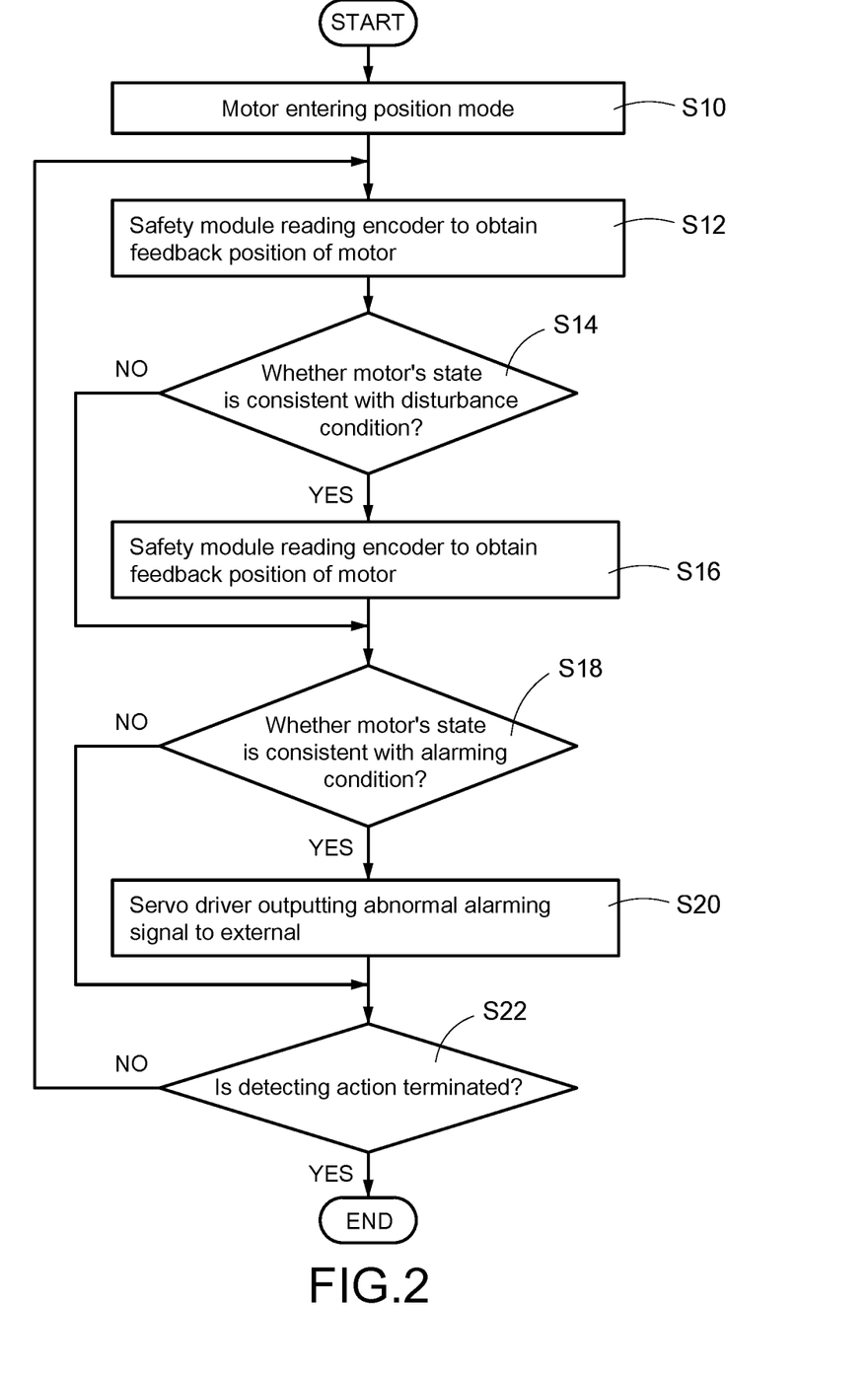
FIG. 2 is a flowchart of the failure diagnostic method of the disclosure in accordance with the first embodiment.

Please refer to FIG. 2, which is a flowchart of the failure diagnostic method of the disclosure in accordance with the first embodiment. The disclosure further discloses a failure diagnostic method of the motor encoder (abbreviated as the diagnostic method hereafter). The diagnostic method may be used for the diagnostic system as shown in FIG. 1, here is not intended to be limiting.

As described above, the safety module 4 of the disclosure is mainly implemented by software or firmware. When the processor (for example, the encoder 2 or the other hardware unit independent from the servo driver 3) executes the software or firmware, the safety module 4 is virtually created to implement each executing step of the diagnostic method of the disclosure.

As shown in FIG. 2, when the diagnostic method of the disclosure is applied, first, the motor 1 needs to enter the position mode (step S10), and the safety module 4 reads the corresponding position information from the encoder 2 of the motor 1 to obtain the feedback position of the motor 1 (step S12).

Specifically, the situation of fixed position generally occurs when the motor 1 is positioning. At the same time, the feedback position indicates that the motor 1 is fixed but the safety module 4 is unable to understand whether the motor 1 is indeed non-rotating or the erroneous feedback position is generated from the failure of the encoder 2. Therefore, the diagnostic method of the disclosure is mainly used to perform failure diagnosis to the encoder 2 under the position mode of the motor 1.

In general, the motor 1 may have the other control modes such as speed mode, torque mode, etc. Under the speed mode and torque mode, the motor 1 is generally controlled to continuously rotate. At the same time, if the feedback position indicates that the motor 1 is fixed, the safety module 4 may be configured to directly assume that the encoder 2 is failed without using the diagnostic system and diagnostic method of the disclosure to diagnose the encoder 2.

The aforementioned description is part of the embodiments of the disclosure, here is not intended to be limiting.

After the step S12, the safety module 4 is configured to determine the state of the motor 1 according to the feedback position, and determine whether the state of the motor 1 is consistent with the predetermined disturbance condition (step S14). If the state of the motor 1 is consistent with the disturbance condition, the safety module 4 is configured to transmit the corresponding control command to the servo driver 3 to request the servo driver 3 to output the additional current command 6 to the motor 1 (step S16). If the state of the motor 1 is not consistent with the disturbance condition, the safety module 4 does not act.

Further, the safety module 4 is configured to simultaneously determine whether the state of the motor 1 is consistent with the predetermined alarming condition (step S18). If the state of the motor 1 is consistent with the alarming condition, the safety module 4 is configured to transmit the corresponding control command to the servo driver 3 to request the servo driver 3 to output the abnormal alarming signal (step S20). If the state of the motor 1 is not consistent with the alarming condition, the safety module 4 does not act.

Moreover, when the safety module 4 executes the diagnostic method of the disclosure, the safety module 4 is configured to continuously determine whether the detecting action to the motor 1 and/or encoder 2 is terminated (step S22). Before the detecting action to the motor 1 and/or encoder 2 is terminated, the safety module 4 is configured to repeatedly execute the step S12 to the step S20 to continuously obtain the feedback position of the motor 1, continuously determine the state of the motor 1, and request the servo driver 3 to output the additional current command 6 and abnormal alarming signal when the designated condition is met.

As described above, the safety module 4 of the disclosure is configured to continuously obtain the feedback position to determine the state of the motor 1. When the position of the motor 1 is determined to be fixed and the fixed time is determined to be reaching the predetermined time span, the safety module 4 is configured to recognize that the motor 1 is consistent with the disturbance condition (that is, the motor 1 needs to be disturbed to ensure whether the encoder 2 is abnormal) or consistent with the alarming condition (that is, the encoder 2 is confirmed to be abnormal and needs to output alarm externally). The disturbance condition and alarming condition are respectively described in the following embodiments.

Figure 3:
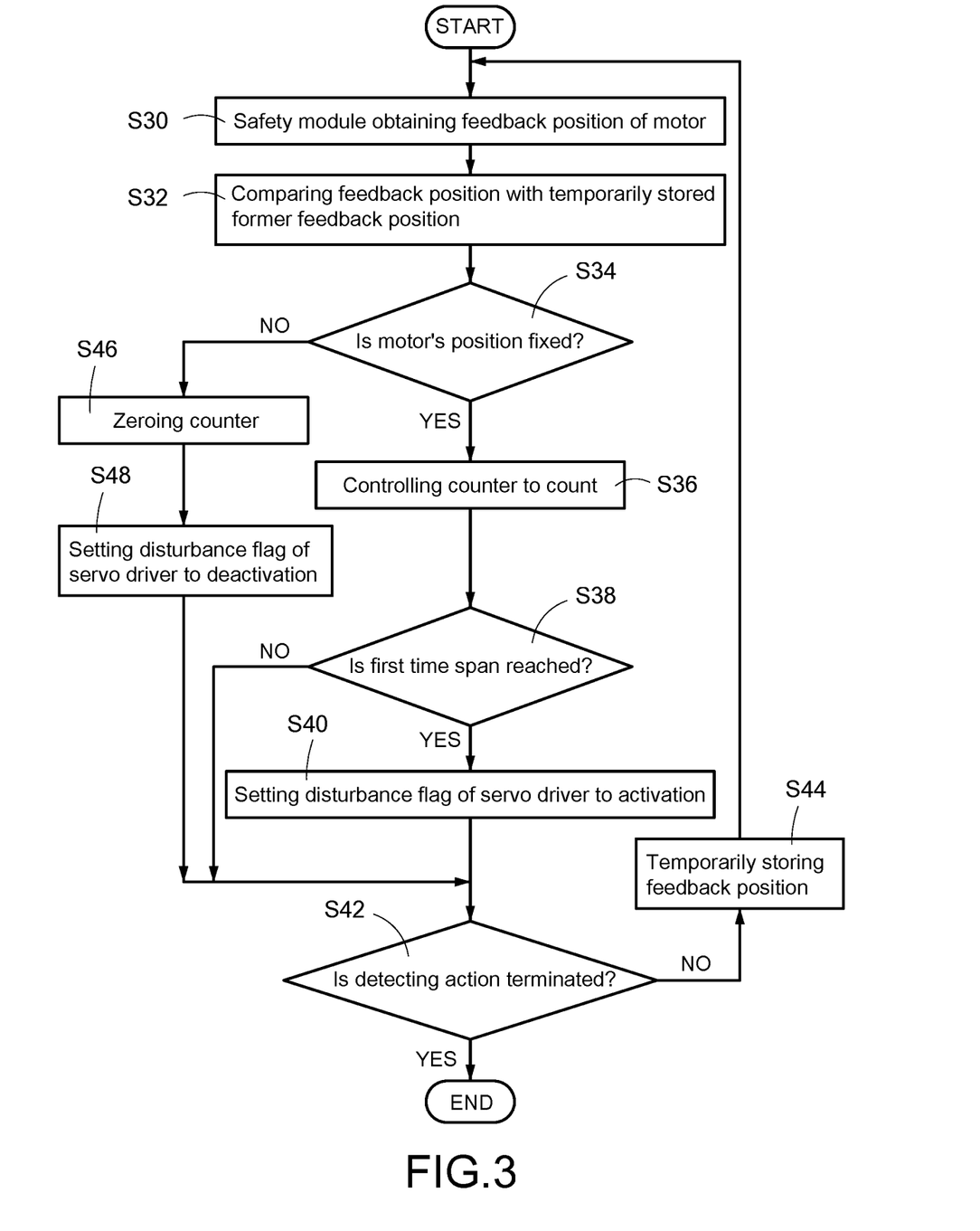
FIG. 3 is a flowchart of the failure diagnostic method of the disclosure in accordance with the second embodiment.

Please refer to FIG. 1 to FIG. 3, FIG. 3 is a flowchart of the failure diagnostic method of the disclosure in accordance with the second embodiment. The disturbance condition is described hereafter based on the embodiment in FIG. 3.

First, the safety module 4 is configured to continuously obtain the feedback position of the motor when the system operates (step S30). Next, the safety module 4 is configured to compare the feedback position obtained in the step S30 and the temporarily stored former feedback position (step S32), and determine whether the position of the motor 1 is fixed based on whether the former and later feedback positions are the same (step S34).

If the position of the motor is determined to be fixed in the step S34, the safety module 4 is configured to control the internal counter (not shown in figures) to count (step S36).

In some embodiments, the safety module 4 is configured to regularly obtain one feedback position in every cycle, determine the position of the motor 1, and control the counter to add one when the position of the motor 1 is determined to be fixed. In the embodiments, the counting content of the counter is equivalent to the executing cycle of the safety module 4.

In some other embodiments, the safety module 4 is configured to obtain the feedback position based on fixed time span (such as 1 ms), determine the position of the motor 1, and control the counter to add one when the position of the motor 1 is determined to be fixed. In the embodiments, the counting content of the counter is equivalent to actual time span.

For better understanding, here uses the counting content of the counter being equivalent to actual time span as an example to explain.

If the position of the motor 1 is determined to be fixed in the step S34, the safety module 4 further determines whether the counter's counting reaches the predetermined first time span (step S38). That is, the safety module 4 is configured to determine whether the fixed time of the motor 1 continues and reaches the first time span, such as 20 ms, 30 ms, etc., according to the counting condition of the counter, here is not intended to be limiting.

If the counter's counting is determined to be reaching the first time span in the step S38, the safety module 4 is configured to recognize that the motor 1 is consistent with the disturbance condition. In the disclosure, the safety module 4 is configured to request the servo driver 3 to transmit the additional current command 6 to the motor 1 when the motor 1 is recognized to be consistent with the disturbance condition.

In some embodiments, the safety module 4 transmits the control command to the servo driver 3, when the motor 1 is recognized to be consistent with the disturbance condition, to set a disturbance flag (not shown in figures) in the servo driver 3 to be activation (step S40). When the servo driver 3 discovers the internal disturbance flag is set to be activated (enable), the servo driver 3 is configured to automatically transmit the additional current command 6 to the motor 1 to disturb the motor 1. If the motor 1 operates normally, the motor 1 may generate shaking after received the additional current command 6 transmitted by the servo driver 3 and slightly change the position thereof.

If the counter's counting is determined to be not reaching the first time span in the step S38, the safety module 4 does not perform any operation temporarily.

Next, the safety module 4 is configured to determine whether the detecting action to the motor 1 and/or encoder 2 is terminated (step S42). If the detecting action to the motor 1 and/or encoder 2 is not terminated, the safety module 4 is configured to temporarily store the feedback position obtained in the step S30 (step S44) and return to the step S30. In the next cycle, the safety module 4 obtains next feedback position of the motor 1 and compares that with the temporarily stored former feedback position to determine whether the position of the motor 1 is fixed.

The above describes the action of the safety module 4 determining that the position of the motor 1 is fixed. If the position of the motor 1 is determined to be changed in the step S34, that represents that the encoder 2 operates normally and the safety module 4 does not need to disturb the motor 1 to test the encoder 2. Under that condition, the safety module 4 is configured to zero the counter (step S46). Further, the safety module 4 may selectively output the control command to the servo driver 3 to set the disturbance flag of the servo driver 3 to be deactivation (disable) (step S48). In the disclosure, the diagnostic system may be configured to set the disturbance flag to be deactivation by the safety module 4, or set the disturbance flag to be deactivation by the servo driver 3 (described hereafter), here is not intended to be limiting.

When the servo driver 3 discovers that the disturbance flag is set to be deactivation, the servo driver 3 does not modify the current command 5 and additional current command 6 presently transmitted to the motor 1. Therefore, the motor 1 is not influenced by the servo driver 3 and does not generate shaking.

Please refer to FIG. 1 to FIG. 4, FIG. 4 is a flowchart of the failure diagnostic method of the disclosure in accordance with the third embodiment. The alarming condition is described hereafter based on the embodiment in FIG. 4.

Figure 4:
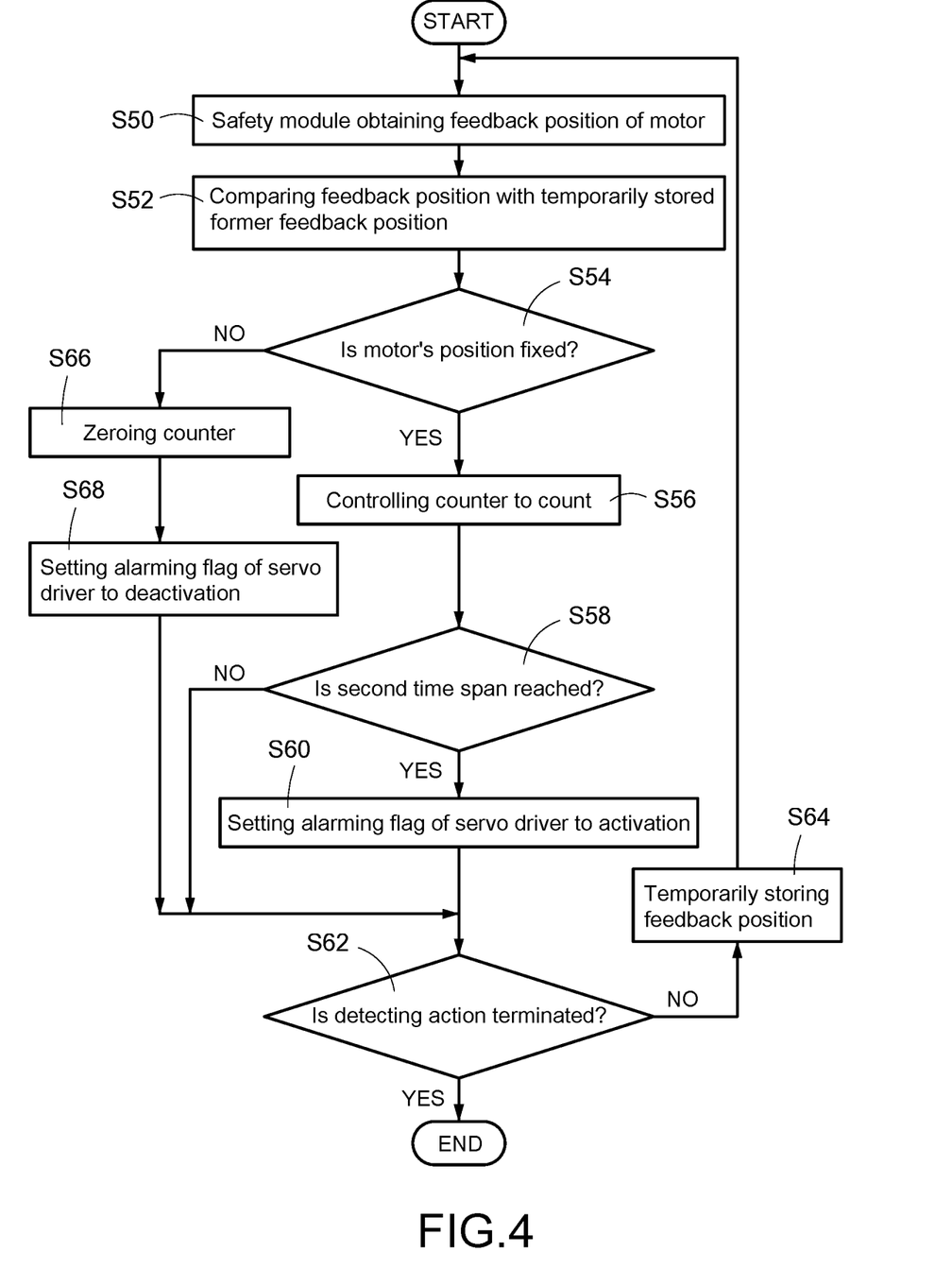
FIG. 4 is a flowchart of the failure diagnostic method of the disclosure in accordance with the third embodiment.

Specifically, the embodiment in FIG. 4 and the embodiment in FIG. 3 may be executed in the same cycle. That is, the steps in FIG. 3 and the steps in FIG. 4 may be executed simultaneously. For better understanding, the steps in FIG. 4 are described independently hereafter.

As shown in FIG. 4, the safety module 4 is configured to continuously obtain the feedback position of the motor (step S50), compare the obtained feedback position and the temporarily stored former feedback position (step S52), and determine whether the position of the motor 1 is fixed (step S54).

If the position of the motor is determined to be fixed in the step S54, the safety module 4 is configured to control the internal counter to count (step S56). Further, the safety module 4 is configured to determine whether the counter's counting reaches the predetermined second time span (step S58). That is, the safety module 4 is configured to determine whether the fixed time of the motor 1 continues and reaches the second time span. If the counter's counting is determined to be reaching the second time span, the safety module 4 is configured to transmit the control command to the servo driver 3 to set an alarming flag (not shown in figures) in the servo driver 3 to be activation (step S60). When the servo driver 3 discovers that the internal alarming flag is set to be activated, the servo driver 3 is configured to automatically output the abnormal alarming signal externally.

If the counter's counting is determined to be not reaching the second time span in the step S58, the safety module 4 does not perform any operation. It is worth mentioning that the embodiment in FIG. 3 and the embodiment in FIG. 4 use the same counter. If the counter's counting reaches the first time span but does not reach the second time span, the safety module 4 is still configured to request the servo driver 3 to output the additional current command 6 to the motor 1.

In some embodiments, the second time span is greater than the first time span in the embodiment of FIG. 3. For example, the second time span may be 50 ms, 60 ms, etc., here is not intended to be limiting.

Here uses that the first time span is 20 ms and the second time span is 50 ms as an example to explain. In some embodiments, the safety module 4 continues to determine whether the position of the motor 1 is fixed by comparing the former and later feedback position. When the position of the motor 1 is determined to be fixed and the fixed time is determined to be reaching 20 ms (that is, the counter's counting is accumulated to be 20 ms), the safety module 4 is configured to make the servo driver 3 transmit the additional current command 6 to the motor 1 by activating the disturbance flag.

If the position of the motor 1 is still fixed after the servo driver 3 transmits the additional current command 6, the counter continues to count (that is, the counter accumulates 21 ms, 22 ms, and so on).

When the safety module 4 determines that the position of the motor 1 is fixed and the counter's counting reaches 40 ms (that is, second time of accumulating 20 ms), the safety module 4 is configured to set the disturbance flag again to make the servo driver 3 to cancel the additional current command 6 presently transmitted to the motor 1 to disturb the motor 1 again (described hereafter).

If the position of the motor 1 is still fixed after the servo driver 3 cancels the additional current command, the counter may continue to count (that is, the counter accumulates 41 ms, 42 ms, and so on).

When the safety module 4 determines that the position of the motor 1 is fixed and the counter's counting reaches 50 ms, the safety module 4 is configured to activate the alarming flag to make the servo driver 3 to output the abnormal alarming signal externally. When the servo driver 3 outputs the abnormal alarming signal, the user may understand that the motor 1 or the encoder 2 is in abnormal condition, thereby performing checking and repairing.

The aforementioned description is part of the embodiments of the disclosure, the counting manner of the counter, the first time span and the second time span are not limited.

Referring back to FIG. 4, in the embodiment of FIG. 4, the safety module 4 is configured to continuously determine whether the detecting action to the motor 1 and/or encoder 2 is terminated (step S62). If the detecting action to the motor 1 and/or encoder 2 is not terminated, the safety module 4 is configured to temporarily store the feedback position obtained in the step S50 (step S64) and return to the step S50. In the next cycle, the safety module 4 obtains next feedback position and compares that with the temporarily stored former feedback position to determine whether the position of the motor 1 is fixed.

Similar with the embodiment in FIG. 3, if the position of the motor 1 is determined to be changed in the step S54, it represents that the safety module 4 does not need to disturb the motor 1 to test the encoder 2. Therefore, the safety module 4 is configured to zero the counter (step S66). Further, the safety module 4 may be configured to selectively output the control command to the servo driver 3 to set the alarming flag of the servo driver 3 to deactivation (step S68). When the servo driver 3 discovers that the alarming flag is set to be deactivated, the servo driver 3 does not output the abnormal alarming signal externally. As a result, the user may understand that the motor 1 and encoder 2 is restored to normal operation.

One technical feature of the disclosure is that the safety module 4 is added to the diagnostic system and the servo driver 3 is modified to add the disturbance flag and the alarming flag. The diagnostic system is configured to monitor the position state of the motor 1 through the safety module 4, and the safety module 4 is configured to set the disturbance flag and alarming flag of the servo driver 3 based on the position state. Therefore, the servo driver 3 may determine whether the additional current command 6 has to be output or canceled in reference to content of the disturbance flag (that is, activation or deactivation), and determine whether the abnormal alarming signal has to be output in reference to content of the alarming flag (that is, activation or deactivation).

Please refer to FIG. 1 to FIG. 5, FIG. 5 is a flowchart of the disturbing of the disclosure in accordance with the first embodiment. The operation of the servo driver 3 is described based on the embodiment in FIG. 5 hereafter.

Figure 5:
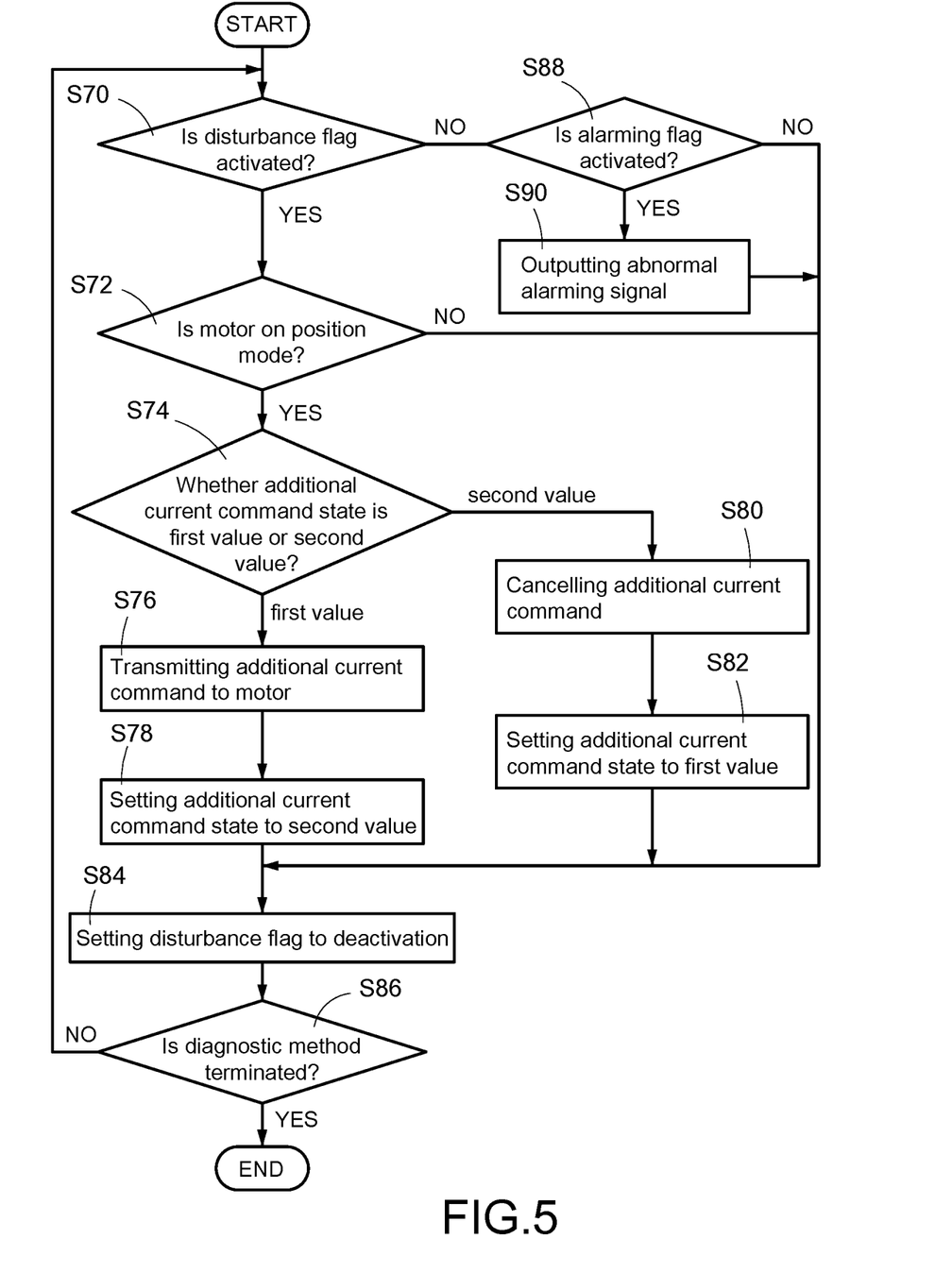
FIG. 5 is a flowchart of the disturbing of the disclosure in accordance with the first embodiment.

As shown in FIG. 5, the servo driver 3 is configured to continuously determine whether the internal disturbance flag is activated (step S70). In some embodiments, if the disturbance flag is determined to be activated, the servo driver 3 is configured to further determine whether the motor is presently on the position mode (step S72).

As described above, the motor 1 is generally fixed on the position mode. In other words, the diagnostic system and the diagnostic method of the disclosure only disturb the motor 1 to confirm whether the encoder 2 is normal under the position mode of the motor 1.

If the disturbance flag is activated and the motor 1 is on the position mode, the safety module 4 is configured to further read internal additional current command state, and determine that present additional current command state is the first value or the second value (step S74). In some embodiments, the first value and second value are different (for example, the first value is zero and second value is one), here is not intended to be limiting.

The disclosure is used to disturb the motor 1 to make the position of the motor 1 be changed, and diagnose whether the encoder 2 is normal according to content of the feedback position.

When the servo driver 3 outputs the additional current command 6 to the motor 1, the motor 1 is influenced to shake, gradually returns to normal, and eventually returns back to original position. When the servo driver 3 disturbs the motor 1 for the next time, the servo driver 3 needs to cancel present additional current command 6 (or output the additional current command 6 with different values) to make the motor 1 shake again. In order to determine the disturbance needs to transmit the additional current command 6 or cancel present additional current command 6, the servo driver 3 is modified in the disclosure to make the servo driver 3 record the additional current command state.

In some embodiments, if the additional current command state presently records the first value (such as zero), it represents that the servo driver 3 does not provide the additional current command 6 to the motor 1. At the same time, the servo driver 3 may transmit the predetermined additional current command 6 to the motor (step S76) and set the additional current command state to be the second value (step S78).

If the additional current command state presently records the second value (such as one), it represents the servo driver 3 continuously provides the additional current command 6 to the motor 1. At the same time, the servo driver 3 may cancel the additional current command 6 (step S80) and set the additional current command state to be the first value (step S82).

In some embodiments, the additional current command 6 may be, for example, about 5% of the rated current of the motor 1. In addition, the action of the servo driver 3 cancelling the additional current command 6 in the step S80 may be, for example, setting the additional current command 6 to 0% of the rated current of the motor 1. The aforementioned description is part of the embodiments of the disclosure, here is not intended to be limiting.

Figure 6:
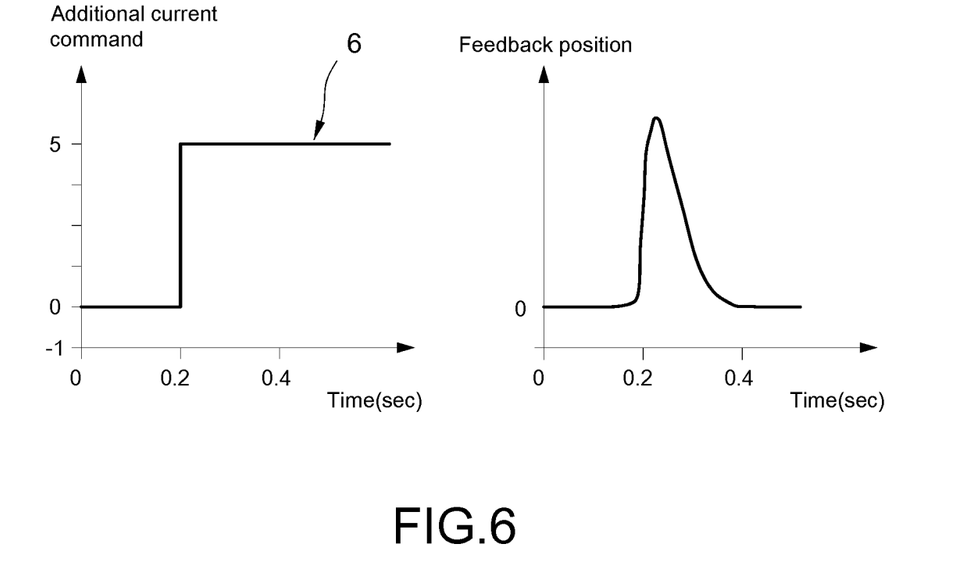
FIG. 6 is a schematic diagram of the disturbing waveform of the disclosure in accordance with the first embodiment.
Figure 7:
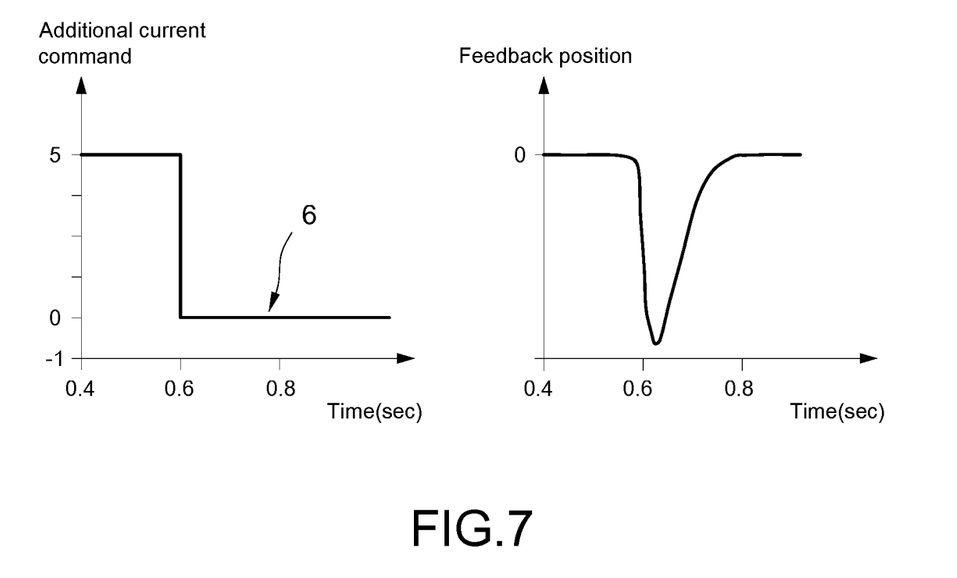
FIG. 7 is a schematic diagram of the disturbing waveform of the disclosure in accordance with the second embodiment.

Please refer to FIG. 6 and FIG. 7, FIG. 6 is a schematic diagram of the disturbing waveform of the disclosure in accordance with the first embodiment. FIG. 7 is a schematic diagram of the disturbing waveform of the disclosure in accordance with the second embodiment.

As shown in FIG. 6, the feedback position of the motor 1 indicates that the position of the motor 1 is fixed and the fixed time continues to 20 ms (that is, fixed from 0 second to 0.2 seconds). At the same time, the safety module 4 outputs the additional current command 6 (FIG. 6 uses 5% of the rated current as an example) to the motor 1. After the motor 1 receives the additional current command 6, the motor 1 shakes toward the first direction. Following the time has passed, the motor 1 stops shaking at near 0.4 seconds and restores to still.

As shown in FIG. 7, the feedback position of the motor 1 indicates that the position of the motor 1 is fixed and the fixed time continues to 20 ms (that is, fixed from 0.4 seconds to 0.6 seconds).

At the same time, the safety module 4 cancels the additional current command 6 (FIG. 7 uses modifying 5% of the rated current to 0% of the rated current as an example). When the motor 1 does not receive original additional current command 6, that motor 1 shakes toward the second direction opposite to the first direction. Following the time has passed, the motor 1 stops shaking at near 0.8 seconds and restores to still.

As shown in FIG. 6 and FIG. 7, if the encoder 2 operates normally, when the safety module 4 transmits or cancels the additional current command 6, the position of the motor 1 is changed and the feedback position obtained by the safety module 4 indicates the change. In other words, if the safety module 4 transmits or cancels the additional current command 6 and the feedback position does not indicate the change as shown in FIG. 6 and FIG. 7, the safety module 4 is configured to assume that the encoder 2 may be in failure condition.

As described above, the safety module 4 is configured to request the servo driver 3 to disturb the motor 1 multiple times before the alarming flag of the servo driver 3 is activated. The servo driver 3 transmits the additional current command 6 (such as 5% of the rated current) to disturb the motor 1 for the first time, cancels the additional current command 6 (such as 0% of the rated current) to disturb the motor 1 for the second time, re-transmits the additional current command 6 to disturb the motor 1 for the third time, and so on, until the alarming flag is activated, the safety module ceases detection or the other terminating conditions are met.

Referring back to FIG. 5, after the additional current command 6 is transmitted or canceled, the servo driver 3 is configured to actively set the disturbance flag to deactivation (step S84). Therefore, the servo driver 3 does not change the state of the additional current command 6 temporarily.

The same with the safety module 4, the servo driver 3 is configured to continuously determine whether the diagnostic method of the disclosure is terminated (step S86), and repeatedly execute the step S70 to step S84, before the diagnostic method is terminated, to transmit or cancel the additional current command 6 based on content of the disturbance flag.

Apart from the disturbance flag, the servo driver 3 is configured to continuously determine whether the internal alarming flag is activated (step S88). If the alarming flag is activated (for example, being set to activation by the safety module 4 in the step S60 of FIG. 4), the servo driver 3 is configured to output the abnormal alarming signal externally based on content of the alarming flag (step S90).

In some embodiments, the servo driver 3 is configured to display the abnormal alarming signal through the driver panel disposed thereon (not shown in figures) in a manner of text, picture, color, or the combination, or play the abnormal alarming signal through the buzzer (not shown in figures) in a manner of sound, here is not intended to be limiting. When the servo driver 3 outputs the abnormal alarming signal, the user may understand that the motor 1 or the encoder 2 is in failure condition.

When the feedback position indicates that the position of the motor 1 is fixed, the disclosure uses the additional current command 6 to make the motor 1 shake. Comparing to the related art, the disclosure does not need to set the position of the motor or the threshold value of the current command, and is applicable to all kinds of encoder (for example, communication type or non-communication type) to facilitate the diagnosis of the encoder.

While this disclosure has been described by means of specific embodiments, numerous modifications and variations may be made thereto by those skilled in the art without departing from the scope and spirit of this disclosure set forth in the claims.

What is claimed is:

1. A failure diagnostic system of a motor encoder, the system comprising:
    a motor, comprising an encoder correspondingly generating a position information according to a rotation of the motor;
    a servo driver, connected with the motor; and
    a safety module, connected with the encoder and the servo driver, and configured to read the position information to obtain a feedback position of the motor and determine whether a state of the motor is consistent with a disturbance condition or an alarming condition according to the feedback position,
    wherein the safety module is configured to request the servo driver to transmit an additional current command to the motor when the state of the motor is determined to be consistent with the disturbance condition, and
    the safety module is configured to request the servo driver to output an abnormal alarming signal when the state of the motor is determined to be consistent with the alarming condition;
    wherein the safety module is configured to determine that the motor is consistent with the disturbance condition when a position of the motor is determined to be fixed and a fixed time is determined to be continued for a first time span based on the feedback position, and determine that the motor is consistent with the alarming condition when the position of the motor is determined to be fixed and the fixed time is determined to be continued for a second time span based on the feedback position, wherein the second time span is greater than the first time span and is at least partially overlapped with the first time span.

2. The failure diagnostic system according to claim 1, wherein the servo driver comprises a disturbance flag and an alarming flag, and the safety module is configured to set the disturbance flag to be activated to make the servo driver transmit the additional current command to the motor and set the alarming flag to be activated to make the servo driver output the abnormal alarming signal.

3. The failure diagnostic system according to claim 2, wherein the safety module is configured to set the disturbance flag and the alarming flag to be deactivated when the position of the motor is determined to be changed based on the feedback position.

4. The failure diagnostic system according to claim 2, wherein the servo driver comprises an additional current command state, the servo driver is configured to read the additional current command state when the disturbance flag is activated, and transmit the additional current command when the additional current command state is a first value and cancel the additional current command when the additional current command state is a second value.

5. The failure diagnostic system according to claim 4, wherein the servo driver is configured to set the additional current command state to be the second value after the additional current command is transmitted, and set the additional current command state to be the first value after the additional current command is canceled.

6. The failure diagnostic system according to claim 4, wherein the servo driver is configured to set the disturbance flag to be deactivated after the additional current command is transmitted or canceled.

7. The failure diagnostic system according to claim 1, wherein the additional current command is about 5% of a rated current.

8. A failure diagnostic method of a motor encoder, the method comprising:
    a) reading an encoder of a motor to obtain a feedback position of the motor;
    b) determining whether a state of the motor is consistent with a disturbance condition or an alarming condition according to the feedback position, wherein the state of the motor is determined to be consistent with the disturbance condition when a position of the motor is determined to be fixed and a fixed time is determined to be continued for a first time span based on the feedback position and determined to be consistent with the alarming condition when the position of the motor is determined to be fixed and the fixed time is determined to be continued for a second time span based on the feedback position, wherein the second time span is greater than the first time span and is at least partially overlapped with the first time span;
    c) when the state of the motor is consistent with the disturbance condition, requesting a servo driver to output an additional current command to the motor; and
    d) when the state of the motor is consistent with the alarming condition, requesting the servo driver to output an abnormal alarming signal.

9. The failure diagnostic method according to claim 8, wherein the b) further comprises:
    B11) comparing the feedback position and a former feedback position to determine whether the position of the motor is fixed;

b12) controlling a counter to count when the position of the motor is determined to be fixed; and b13) determining that the motor is consistent with the disturbance condition when a counting of the counter reaches the first time span.

10. The failure diagnostic method according to claim 9, wherein the b) further comprises:

b14) determining that the motor is consistent with the alarming condition when the counting of the counter reaches the second time span.

11. The failure diagnostic method according to claim 9, wherein the c) further comprises: when the motor is consistent with the disturbance condition, setting a disturbance flag in the servo driver to be activated to make the servo driver transmit the additional current command to the motor based on the disturbance flag; and the d) further comprises: when the motor is consistent with the alarm in condition, setting an alarming flag in the servo driver to be activated to make the servo driver output the abnormal alarming signal based on the alarming flag.

12. The failure diagnostic method according to claim 11, further comprising:

e) controlling the counter to zero when the position of the motor is determined to be changed; and f) setting the disturbance flag and the alarming flag to be deactivated when the position of the motor is determined to be changed.

13. The failure diagnostic method according to claim 11, further comprising:

g) reading, by the servo driver, an additional current command state when the disturbance flag is activated;

h) transmitting the additional current command when the additional current command state is a first value, and setting the additional current command state to be a second value;

i) canceling the additional current command when the additional current command state is the second value, and setting the additional current command state to be the first value; and j) setting the disturbance flag to be deactivated after the h) or the i).

14. The failure diagnostic method according to claim 13, wherein the g) further comprises:

g1) determining, by the servo driver, whether the motor operates on a position mode when the disturbance flag is activated; and g2) reading the additional current command state when the motor operates on the position mode.

* * * * *